United States Patent
Dai et al.

(10) Patent No.: US 10,084,204 B2
(45) Date of Patent: Sep. 25, 2018

(54) ELECTROLYTE SOLUTION AND SULFUR-BASED OR SELENIUM-BASED BATTERIES INCLUDING THE ELECTROLYTE SOLUTION

(71) Applicant: GM GLOBAL TECHNOLOGY OPERATIONS LLC, Detroit, MI (US)

(72) Inventors: Fang Dai, Sterling Heights, MI (US); Mei Cai, Bloomfield Hills, MI (US); Qiangfeng Xiao, Troy, MI (US); Li Yang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 418 days.

(21) Appl. No.: 14/803,632

(22) Filed: Jul. 20, 2015

(65) Prior Publication Data
US 2016/0020491 A1     Jan. 21, 2016

Related U.S. Application Data

(60) Provisional application No. 62/027,020, filed on Jul. 21, 2014.

(51) Int. Cl.
*H01M 10/0567*      (2010.01)
*H01M 10/0569*      (2010.01)
(Continued)

(52) U.S. Cl.
CPC ........ *H01M 10/0567* (2013.01); *H01M 4/386* (2013.01); *H01M 4/581* (2013.01);
(Continued)

(58) Field of Classification Search
CPC .................................................. H01M 10/056
See application file for complete search history.

(56) References Cited

U.S. PATENT DOCUMENTS

| | | |
|---|---|---|
| 7,517,612 B2 | 4/2009 | Ryu et al. |
| 7,722,994 B2 | 5/2010 | Halalay |
| | (Continued) | |

FOREIGN PATENT DOCUMENTS

| | | |
|---|---|---|
| CN | 1218422 C | 9/2005 |
| CN | 100444457 C | 12/2008 |
| | (Continued) | |

OTHER PUBLICATIONS

First Office Action for Chinese Application No. 201510629022.9 dated May 15, 2017 with English language translation; 9 pages.

(Continued)

*Primary Examiner* — James Lee
(74) *Attorney, Agent, or Firm* — Harness, Dickey & Pierce, P.L.C.

(57) ABSTRACT

An example of an electrolyte solution includes a solvent, a lithium salt, a fluorinated ether, and an additive. The additive is selected from the group consisting of $RS_xR'$, wherein x ranges from 3 to 18, and $R-(S_nSe_m)-R$, wherein $2<n<8$ and $2<m<8$. R and R' are each independently selected from a straight alkyl group having from 1 carbon to 6 carbons or branched alkyl group having from 1 carbon to 6 carbons. The electrolyte solution may be suitable for use in a sulfur-based battery or a selenium-based battery.

15 Claims, 4 Drawing Sheets

(51) Int. Cl.
| | |
|---|---|
| H01M 10/0568 | (2010.01) |
| H01M 10/052 | (2010.01) |
| H01M 4/38 | (2006.01) |
| H01M 4/58 | (2010.01) |

(52) U.S. Cl.
CPC ........ *H01M 4/5815* (2013.01); *H01M 10/052* (2013.01); *H01M 10/0568* (2013.01); *H01M 10/0569* (2013.01); *H01M 2300/0028* (2013.01); *H01M 2300/0037* (2013.01)

(56) References Cited

U.S. PATENT DOCUMENTS

| | | | |
|---|---|---|---|
| 8,394,539 | B2 | 3/2013 | Geiculescu et al. |
| 8,586,222 | B2 | 11/2013 | Timmons et al. |
| 8,802,301 | B2 | 8/2014 | Halalay et al. |
| 8,974,946 | B2 | 3/2015 | Cai et al. |
| 9,123,939 | B2 | 9/2015 | Xiao et al. |
| 9,160,036 | B2 | 10/2015 | Yang et al. |
| 9,252,411 | B2 | 2/2016 | Abd Elhamid et al. |
| 9,302,914 | B2 | 4/2016 | Liu et al. |
| 9,350,046 | B2 | 5/2016 | Huang |
| 9,437,871 | B2 | 9/2016 | Zhou et al. |
| 9,537,144 | B2 | 1/2017 | Huang et al. |
| 9,647,254 | B2 | 5/2017 | Dadheech et al. |
| 9,742,028 | B2 | 8/2017 | Zhou et al. |
| 2002/0102466 | A1 | 8/2002 | Hwang et al. |
| 2005/0053839 | A1 | 3/2005 | Ryu et al. |
| 2012/0109503 | A1 | 5/2012 | Yang et al. |
| 2013/0337347 | A1* | 12/2013 | Pol ............... H01M 4/583 429/341 |
| 2014/0170459 | A1 | 6/2014 | Wang et al. |
| 2015/0056387 | A1 | 2/2015 | Dadheech et al. |
| 2015/0056493 | A1 | 2/2015 | Dadheech et al. |
| 2015/0056507 | A1 | 2/2015 | Dadheech et al. |
| 2015/0118535 | A1* | 4/2015 | Smith ............... H01M 10/0565 429/101 |
| 2015/0236324 | A1 | 8/2015 | Xiao et al. |
| 2015/0349307 | A1 | 12/2015 | Dadheech et al. |
| 2016/0017268 | A1 | 1/2016 | Kim et al. |
| 2016/0020491 | A1 | 1/2016 | Dai et al. |
| 2016/0111721 | A1 | 4/2016 | Xiao et al. |
| 2016/0141598 | A1 | 5/2016 | Dai et al. |
| 2016/0172665 | A1 | 6/2016 | Zhou et al. |
| 2016/0172681 | A1 | 6/2016 | Yang et al. |
| 2016/0172706 | A1 | 6/2016 | Xiao et al. |
| 2016/0172710 | A1 | 6/2016 | Liu et al. |
| 2016/0211498 | A1 | 7/2016 | Kim et al. |
| 2016/0218342 | A1 | 7/2016 | Xiao et al. |
| 2016/0254567 | A1 | 9/2016 | Cai et al. |
| 2017/0162859 | A1 | 6/2017 | Yang et al. |
| 2017/0214079 | A1 | 7/2017 | Dai et al. |
| 2017/0222210 | A1 | 8/2017 | Xiao |
| 2017/0271678 | A1 | 9/2017 | Yang et al. |
| 2017/0288230 | A1 | 10/2017 | Yang et al. |
| 2017/0338490 | A1 | 11/2017 | Xiao et al. |

FOREIGN PATENT DOCUMENTS

| | | | |
|---|---|---|---|
| CN | 102306835 A | 1/2012 | |
| CN | 105280953 A | 1/2016 | |
| DE | 102015111777 A1 | 1/2016 | |
| WO | WO 2013/0155038 | * 10/2013 | ............. H01M 6/04 |

OTHER PUBLICATIONS

Second Office Action for Chinese Application No. 201510629022.9 dated Nov. 23, 2017; 6 pages.

Li Yang et al.; U.S. Appl. No. 15/237,378, filed Aug. 15, 2016 entitled "Gel Electrolytes and Precursors Thereof"; 23 pages.

Xiaosong Huang; U.S. Appl. No. 15/253,052, filed Aug. 31, 2016 entitled "Methods of Making Separators for Lithium Ion Batteries"; 46 pages.

Li Yang et al.; U.S. Appl. No. 15/295,600, filed Oct. 17, 2016 entitled "Three-Electrode Test Cell"; 33 pages.

Fang Dai et al.; U.S. Appl. No. 15/473,052, filed Mar. 29, 2017 entitled "Microporous and Hierarchical Porous Carbon"; 48 pages.

Fang Liu et al.; U.S. Appl. No. 15/666,170, filed Aug. 1, 2017 entitled "Conformal Coating of Lithium Anode via Vapor Deposition for Rechargeable Lithium Ion Batteries"; 52 pages.

Li Yang et al.; U.S. Appl. No. 15/677,249, filed Aug. 15, 2017 entitled "Ether-Based Electrolyte System Improving or Supporting Anodic Stability of Electrochemical Cells Having Lithium-Containing Anodes"; 44 pages.

Li Yang et al.; U.S. Appl. No. 15/677,389, filed Aug. 15, 2017 entitled "Carbonate-Based Electrolyte System Improving or Supporting Efficiency of Electrochemical Cells Having Lithium-Containing Anodes"; 41 pages.

Fang Dai et al.; U.S. Appl. No. 15/677,760, filed Aug. 15, 2017 entitled "Lithium Metal Battery With Hybrid Electrolyte System"; 48 pages.

Xingcheng Xiao et al.; U.S. Appl. No. 15/692,107, filed Aug. 31, 2017 entitled "Methods of Applying Self-Forming Artificial Solid Electrolyte Interface (SEI) Layer to Stabilize Cycle Stability of Electrodes in Lithium Batteries"; 45 pages.

Li Yang et al.; U.S. Appl. No. 15/710,326, filed Sep. 20, 2017 entitled "Hybrid Metal-Organic Framework Separators for Electrochemical Cells"; 46 pages.

Li Yang et al.; U.S. Appl. No. 15/856,292, filed Dec. 28, 2017 entitled "Electrolyte System for Lithium-Chalcogen Batteries"; 41 pages.

Jie Gao et al. "Effects of Liquid Electrolytes on the Charge Discharge Performance of Rechargeable Lithium/Sulfur Batteries: Electrochemical and in-Situ X-ray Absorption Spectroscopic Studies" *J. Phys. Chem. C* 2011, 115, 25132-25137.

Chen et al., RSC Adv. 2013, 3, 3540.

Fei Ding et al.; "Effects of Carbonate Solvents and Lithium Salts on Morphology and Coulombic Efficiency of Lithium Electrode"; Journal of the Electrochemical Society; pp. A1894-A1901; Sep. 4, 2013; 8 pages.

Jiangfeng Qian et al.; "High Rate and Stable Cycling of Lithium Metal Anode"; Nature Communications; DOI: 10.1038/ncomms7362; Feb. 20, 2015; 9 pages.

Vinodkumar Etacheri et al.; "Challenges in the Development of Advanced Li-Ion Batteries: A Review"; Energy & Environmental Science, DOI:10.1039/c1ee01598b; www.rsc.org/ees; Jul. 26, 2011; 21 pages.

Xu et al., Adv. Energy Mater. 2013, 3, 833.

* cited by examiner

US 10,084,204 B2

ELECTROLYTE SOLUTION AND SULFUR-BASED OR SELENIUM-BASED BATTERIES INCLUDING THE ELECTROLYTE SOLUTION

CROSS-REFERENCE TO RELATED APPLICATIONS

This application claims the benefit of U.S. Provisional Patent Application Ser. No. 62/027,020, filed Jul. 21, 2014, which is incorporated by reference herein in its entirety.

BACKGROUND

Secondary, or rechargeable, lithium batteries are often used in many stationary and portable devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of an electrolyte solution includes a solvent, a lithium salt, a fluorinated ether, and an additive. The additive is selected from the group consisting of $RS_xR'$, wherein x ranges from 3 to 18, and $R-(S_nSe_m)-R$, wherein $2<n<8$ and $2<m<8$. R and R' are each independently selected from a straight alkyl group having from 1 carbon to 6 carbons or branched alkyl group having from 1 carbon to 6 carbons. The electrolyte solution may be suitable for use in a sulfur-based battery or a selenium-based battery.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
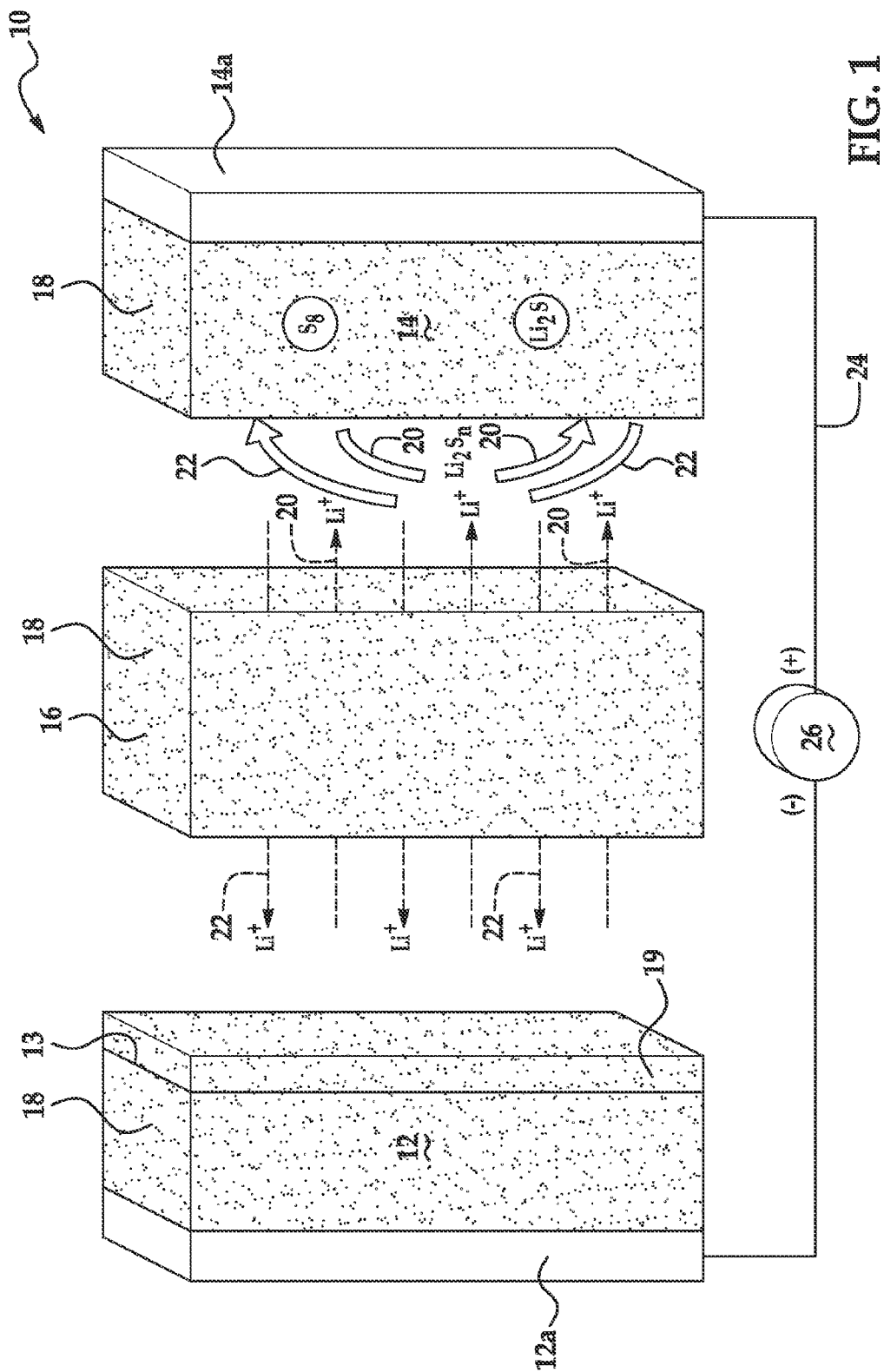
FIG. 1 is a schematic, perspective view of an example of a sulfur-based battery showing a charging and discharging state, the battery including an electrolyte according to an example of the present disclosure.

Lithium batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes. In some lithium batteries, the positive electrode is sulfur-based, and is paired with a lithium negative electrode (e.g., a Li—S battery) or a silicon negative electrode (e.g., a Si—S battery). In other lithium batteries, the positive electrode is selenium-based, and is paired with a graphite negative electrode, a lithium negative electrode, or a silicon negative electrode. Sulfur and selenium may be desirable as active materials for the positive electrode, in part because they have high theoretical capacities (e.g., about 1672 mAh/g for sulfur, and about 678 mAh/g for selenium).

However, both sulfur and selenium positive electrodes may experience an undesirable shuttling effect and may also contribute to self-discharging of the battery.

Shuttling is the migration or diffusion of lithium-polysulfide or lithium-polyselenide intermediates, respectively, from the sulfur-based positive electrode or the selenium-based positive electrode during the battery charge process. Lithium-polysulfide intermediates ($LiS_x$, where x is $2<x<8$) or lithium-polyselenide intermediates ($Li_2Se_x$, where x is $2<x<8$) generated at the positive electrode are generally soluble in the battery electrolyte, and can migrate to the negative electrode where they react with the negative electrode in a parasitic fashion to generate lower-order lithium-polysulfide or lithium-polyselenide intermediates. These lithium-polysulfide or lithium-polyselenide intermediates may diffuse back to the positive electrode and regenerate the higher forms of lithium-polysulfide or lithium-polyselenide intermediates. As a result, a shuttle effect takes place in the battery. The shuttling effect may lead to parasitic loss of active lithium at the negative electrode, which prevents reversible electrode operation and reduces the useful life of the lithium-sulfur or lithium-selenium battery. Furthermore, these lithium-polysulfide or lithium-polyselenide intermediate anions are a strong Lewis base due to their electron rich characteristic, and thus will attack chemicals having electron withdrawing group(s), such as carbonyl groups.

Self-discharge may be one result from the shuttling effect. Self-discharge results when internal chemical reactions take place in the battery, even when no connection is made between the positive and negative electrodes. These reactions may take place between the electrode active material(s) and the electrode. These reactions can reduce the stored charge of the battery.

An example of the electrolyte solution disclosed herein includes a fluorinated ether and an additive selected from the group consisting of $RS_xR'$ (x ranges from 3 to 18) and $R-(S_nSe_m)-R$ ($2<n<8$ and $2<m<8$), where R and R' are each independently selected from a straight alkyl group having from 1 carbon to 6 carbons or branched alkyl group having from 1 carbon to 6 carbons. A battery including this electrolyte solution exhibits increased capacity and stability, and also reduces self-discharge.

More specifically, the fluorinated ether in the electrolyte solution suppresses self-discharge by forming a stable SEI layer on a surface of the negative electrode or on a surface of another SEI layer already formed on the negative electrode during pre-lithiation (with a pre-lithiation electrolyte). The SEI layer(s) keeps the negative electrode active material (e.g., lithium, silicon, or graphite) from coming into contact with the remaining electrolyte solution, and thus reduces or prevents undesirable internal chemical reactions from taking place, and thus reduces or prevents self-discharge. Furthermore, by "stable", it is meant that the formed SEI layer(s) is/are relatively resistant to decomposition when exposed to lithium-polysulfide or lithium-polyselenide intermediates. As such, the stable SEI layer(s), which is formed using the electrolyte solution disclosed herein (alone or with another pre-lithiation electrolyte during a pre-lithiation process), remains intact when exposed to lithium-polysulfide or lithium-polyselenide intermediates, and thus consumes less of the electrolyte and acts as a barrier layer that keeps the lithium-polysulfide or lithium-polyselenide intermediates from reaching the negative electrode. This reduces the deleterious effects of shuttling.

Overall, the use of the electrolyte solution disclosed herein can contribute to an improved battery life cycle and stability, and improved battery performance.

In the examples disclosed herein, the electrolyte solution includes a solvent, a lithium salt, a fluorinated ether, and an additive selected from the group consisting of $RS_xR'$, wherein x ranges from 3 to 18, and $R-(S_nSe_m)-R$, wherein $2<n<8$ and $2<m<8$, and wherein R and R' are each independently selected from a straight or branched alkyl group having from 1 carbon to 6 carbons.

The solvent may be 1,3-dioxolane (DOL), dimethoxyethane (DME), or a mixture of 1,3-dioxolane and dimethoxyethane. In some examples disclosed herein, the volume to volume ratio of the solvents (DOL to DME) ranges from 10 to 0 to 0 to 10. In an example, the volume to volume ratio of DOL to DME is 1 to 1.

The electrolyte solution includes any lithium salt that dissolves in the selected solvent(s). As examples, the lithium salt may be $LiN(CF_3SO_2)_2$ (LiTFSI or Lithium Bis(Trifluoromethanesulfonyl)Imide), $LiAlCl_4$, LiI, LiBr, LiSCN, $LiB(C_6H_5)_4$, $LiAsF_6$, $LiCF_3SO_3$, $LiPF_4(C_2O_4)$ (LiFOP), $LiNO_3$, $LiPF_6$, $LiBF_4$, $LiClO_4$, $LiB(C_2O_4)_2$ (LiBOB), $LiBF_2(C_2O_4)$ (LiODFB), $LiN(FSO_2)_2$ (LiFSI), $LiPF_3(C_2F_5)_3$ (LiFAP), $LiPF_4(CF_3)_2$, $LiPF_3(CF_3)_3$, $LiSO_3CF_3$, and combinations thereof. In an example, the electrolyte solution includes a combination of LiTFSI and $LiNO_3$. The concentration of the lithium salt in the electrolyte solution ranges from about 0.1 M to about 2 M.

The fluorinated ether may be Bis(2,2,2-trifluoroethyl) ether ($F_3C-CH_2-O-CH_2-CF_3$) and/or Propyl 1,1,2,2-tetrafluoroethyl ether ($H_7C_3-O-CF_2-CHF_2$). The concentration of the fluorinated ether in the electrolyte solution ranges from about 0.1 M to about 1 M.

As noted above, the additive may be $RS_xR'$ or $R-(S_x-Se_m)-R$. It is to be understood that either of these additives may be used in any of the batteries disclosed herein. The additive is in liquid form and is miscible (in any ratio) in the solvents disclosed herein. The amount of the additive in the electrolyte solution ranges from about 1 vol % to about 50 vol % of the total volume percent of the solution. If included in amounts greater than 50 vol %, the lithium salt may not dissolve. The concentration of the additive in the electrolyte solution ranges from about 0.2 M to about 1 M.

$RS_xR'$ is at least an organotrisulfide compound, where x ranges from 3 to 18 and where R and R' are each independently selected from a straight or branched alkyl group having from 1 carbon to 6 carbons. R and R' may be the same or different. Examples of R and/or R' include methyl, ethyl, isopropyl, etc. This compound is added directly to the electrolyte solution, and is not an intermediate product resulting from reactions taking place in the battery. As illustrated in the Examples section herein, the addition of an organotrisulfide additive to an electrolyte solution used in a selenium-based battery provides about a 20% increase in capacity compared to a similar electrolyte solution without the organotrisulfide. This capacity is beyond the theoretical capacity of selenium.

$R-(S_nSe_m)-R$ is an organo-poly-sulfur-selenium, where $2<n<8$ and $2<m<8$, and where R is a straight alkyl group having from 1 carbon to 6 carbons or a branched alkyl group having from 1 carbon to 6 carbons. Examples of R methyl, ethyl, isopropyl, etc. This compound is added directly to the electrolyte solution. The addition of an organo-poly-sulfur-selenium additive to an electrolyte solution used in a sulfur-based battery is also believed to provide about a 20% increase in capacity compared to a similar electrolyte solution without the organo-poly-sulfur-selenium. This significant increase in performance is unexpected, in part because such large increases in capacity have not been reported for lithium based batteries, and sulfur and selenium are different elements with different properties.

The electrolyte solution disclosed herein may be prepared by mixing the lithium salt, the fluorinated ether, and the additive in the solvent(s) until the components dissolve. The mixture may be stirred.

It is to be understood that the electrolyte solution disclosed herein may be used in a sulfur-based battery, an example of which is shown at reference numeral 10 in FIG. 1. The sulfur-based battery 10 includes a negative electrode 12, a positive electrode 14, and a porous polymer separator 16 positioned between the negative and positive electrodes 12, 14.

The negative electrode 12 may include a binder material, a conductive filler material, and an active material. In an example, fabrication of the negative electrode 12 involves dispersing the active material, the binder material, and the conductive filler material at a certain ratio into an organic solvent or water. The dispersion may be mixed to obtain a homogeneous solution. The solution may then be doctor blade coated (or otherwise deposited) onto a negative-side (e.g., copper) current collector (e.g., 12a in FIG. 1) and dried.

The resulting negative electrode 12 may include up to 90% by total weight (i.e., 90 wt %) of the active material. In an example, the active material is present in an amount ranging from about 40% by weight to about 90% by weight. The negative electrode 12 may include from 0% by weight to about 30% by weight of the conductive filler. Additionally, the negative electrode 12 may include from 0% by weight to about 20% by weight of the binder material. In an example, the negative electrode 12 includes about 70 wt % of the active material, about 15 wt % of the conductive filler material, and about 15 wt % of the binder material. In another example, the negative electrode 12 includes about 85 wt % of the active material, about 10 wt % of the conductive filler, and about 5 wt % of the binder material.

The binder material may be used to structurally hold the active material together. Examples of the binder material may be made of at least one of polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Other suitable binders include polyvinyl alcohol (PVA), sodium alginate, or other water-soluble binders.

The conductive filler material may be a conductive carbon material. The conductive carbon material may be a high surface area carbon, such as acetylene black, or another carbon material (e.g., Super P). The conductive filler material is included to ensure electron conduction between the active material and the negative-side current collector 12a.

In this example, the active material of the negative electrode 12 may be lithium or silicon. One example of a lithium-based active material is lithium titanate. Lithium foil may also be used, and this negative electrode 12 may not include a binder or a conductive filler material.

The silicon-based negative electrode 12 includes any silicon-based lithium host material (i.e., active material) that can sufficiently undergo lithium alloying and dealloying with copper functioning as the negative terminal 12a. Examples of the silicon active material include crystalline silicon, amorphous silicon, silicon oxide ($SiO_x$), silicon alloys (e.g., Si—Sn), etc. The silicon active material may be in the form of a powder, particles, etc. ranging from nano-size to micro-size.

A negative electrode 12 including silicon as the active material may be pre-lithiated using a lithium-silicon half cell method. More specifically, the Li—Si half cell is assembled using the silicon-based negative electrode 12, which is soaked in a pre-lithiation electrolyte solution including a lithium salt dissolved in a solvent mixture of dimethoxyethane (DME) and fluoroethylene carbonate (FEC).

As examples in the pre-lithiation electrolyte, the lithium salt may be $LiPF_6$, $LiBF_4$, $LiClO_4$, $LiN(SO_2CF_3)_2$ (LiTFSI), $LiB(C_2O_4)_2$ (LiBOB), $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_3(CF_3)_3$, or any other lithium salts previously mentioned herein. In an example, the lithium salt in the pre-lithiation electrolyte is 1M $LiPF_6$.

As noted above, in the pre-lithiation electrolyte, the lithium salt is dissolved in the solvent mixture of dimethoxyethane (DME) and fluoroethylene carbonate (FEC). The volume to volume ratio of the solvents (DME to FEC) ranges from 10 to 1 to 1 to 10. In an example, the volume to volume ratio of DME to FEC is 3 to 1. It has been found that using FEC as a co-solvent forms a desirable SEI layer 19 on the exposed surface(s) 13 of the silicon-based (or graphite-based discussed below) negative electrode 12 during the pre-lithiation process. The FEC is active and readily decomposes during pre-lithiation to form the SEI layer 19.

A voltage potential is applied to the half cell, which causes the FEC in the electrolyte solution to decompose. The decomposition product deposits on the exposed surface(s) 13 of the silicon-based negative electrode 12 to form an example of the SEI layer 19. The decomposition product may be LiF, $Li_2CO_3$, $Li_xPF_yO_z$, F-replaced Lithium Ethylene Di Carbonate (F-LEDC), an unsaturated polyolefin, etc. The voltage potential is applied for a time sufficient to form the SEI layer 19. In an example, when a higher current is used, the exposure time may be shorter. Similarly, when a lower current is used, the exposure time may be longer. The SEI layer 19 may have a thickness of about 10 nm or less.

In another example, the silicon-based negative electrode 12 may be pre-lithiated by short circuiting lithium-silicon having the previously described electrolyte solution positioned therebetween. This may be accomplished for a time period ranging from about 1 hour to about 24 hours.

During pre-lithiation, lithium ions are dissolved (or de-plated) from lithium metal and are alloyed with silicon by an electroformation reaction with the electrolyte solution (which can conduct the lithium ions). The lithium ions can alloy with the silicon-based active material, thereby lithiating the silicon-based negative electrode 12.

When pre-lithiation is complete, the lithiated silicon-based negative electrode 12 having the SEI layer 19 formed thereon may be rinsed to remove any remaining electrolyte solution, and then may be used in the silicon-sulfur battery 10.

It is to be understood that the negative electrode 12 may not be pre-lithiated (e.g., when lithium is used as the active material). In this example, the SEI layer 19 may be formed on the surface 13 of the negative electrode 12 using the electrolyte solution disclosed herein. In this example, during the discharge process the fluorinated ether in the electrolyte solution is caused to decompose similarly to the FEC in the pre-lithiation electrolyte.

The positive electrode 14 in the lithium-sulfur or silicon-sulfur battery 10 includes any example of the previously mentioned binder material, any example of the previously mentioned conductive filler material, and a sulfur-based active material. In this example, the conductive filler material is included to ensure electron conduction between the sulfur-based active material and the positive-side current collector 14a (e.g., aluminum).

It is to be understood that any sulfur-based active material that can sufficiently undergo lithium alloying and dealloying with aluminum functioning as the positive terminal of the battery 10. An example of sulfur-based active material includes a sulfur-carbon composite having a ratio of sulfur to carbon ranging from 1:9 to 9:1.

The positive electrode 14 may be made in a similar manner as the negative electrode 12, and the resulting electrode 14 may include up to 90% by total weight (i.e., 90 wt %) of the sulfur-based active material. In an example, the positive electrode 14 includes about 80 wt % of the sulfur-based active material, about 10 wt % of the conductive carbon material, and about 10 wt % of the binder material.

The sulfur-based battery 10 also includes the porous polymer separator 16. The porous polymer separator 16 may be formed, e.g., from a polyolefin. The polyolefin may be a homopolymer (derived from a single monomer constituent)

or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 16 include single layer polypropylene membranes, such as CELGARD 2400 and CELGARD 2500 from Celgard, LLC (Charlotte, N.C.). It is to be understood that the porous separator 16 may be coated or treated, or uncoated or untreated. For example, the porous separator 16 may or may not be coated or include any surfactant treatment thereon.

In other examples, the porous separator 16 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separator 16 is poly(p-hydroxybenzoic acid). In yet another example, the porous separator 16 may be chosen from a combination of the polyolefin (such as PE and/or PP) and one or more of the other polymers listed above.

The porous separator 16 may be a single layer or may be a multi-layer (e.g., bilayer, trilayer, etc.) laminate fabricated from either a dry or wet process. For example, a single layer of the polyolefin and/or other listed polymer may constitute the entirety of the porous separator 16. As another example, multiple discrete layers of similar or dissimilar polyolefins and/or polymers may be assembled into the porous separator 16. In one example, a discrete layer of one or more of the polymers may be coated on a discrete layer of the polyolefin to form the porous separator 16. In some instances, the porous separator 16 may include fibrous layer(s) to impart appropriate structural and porosity characteristics.

The porous separator 16 operates as an electrical insulator (preventing the occurrence of a short), a mechanical support, and a barrier to prevent physical contact between the two electrodes 12, 14. The porous separator 16 also ensures passage of lithium ions (identified by the $Li^+$) through an electrolyte 18 filling its pores.

Furthermore, the porous separator 16 may have an average pore size of less than 1 micron. The porous separator 16 thickness may range from about 10 microns to about 50 microns.

As shown in FIG. 1, each of the negative electrode 12, the positive electrode 14, and the porous separator 16 are soaked in the battery electrolyte 18. In the examples disclosed herein, the battery electrolyte 18 is the previously described electrolyte solution (which is not to be confused with the pre-lithiation electrolyte solution disclosed herein).

The current collectors 12a and 14a of the battery 10 are respectively positioned in contact with the negative electrode 12 and the positive electrode 14 to collect and move free electrons to and from an external circuit 24.

The sulfur-based battery 10 may also support a load device 26 that can be operatively connected to the external circuit 24. The load device 26 receives a feed of electrical energy from the electric current passing through the external circuit 24 when the battery 10 is discharging. While the load device 26 may be any number of known electrically-powered devices, a few specific examples of a power-consuming load device include an electric motor for a hybrid vehicle or an all-electrical vehicle, a laptop computer, a cellular phone, and a cordless power tool. The load device 26 may also, however, be a power-generating apparatus that charges the sulfur-based battery 10 for purposes of storing energy. For instance, the tendency of windmills and solar panels to variably and/or intermittently generate electricity often results in a need to store surplus energy for later use.

The sulfur-based battery 10 can include a wide range of other components that, while not depicted here, are nonetheless known to skilled artisans. For instance, the sulfur-based battery 10 may include a casing, gaskets, terminals, tabs, and any other desirable components or materials that may be situated between or around the positive electrode 14 and the negative electrode 12 for performance-related or other practical purposes. Moreover, the size and shape of the sulfur-based battery 10, as well as the design and chemical make-up of its main components, may vary depending on the particular application for which it is designed. Battery-powered automobiles and hand-held consumer electronic devices, for example, are two instances where the sulfur-based battery 10 would most likely be designed to different size, capacity, and power-output specifications. The sulfur-based battery may also be connected in series and/or in parallel with other similar sulfur-based batteries to produce a greater voltage output and current (if arranged in parallel) or voltage (if arranged in series) if the load device 26 so requires.

The sulfur-based battery 10 can generate a useful electric current during battery discharge (shown by reference numeral 20 in FIG. 1). During discharge, the chemical processes in the battery 10 include lithium ($Li^+$) dissolution from the surface of the negative electrode 12 and incorporation of the lithium cations into alkali metal polysulfide salts (i.e., $Li_2S_n$) in the positive electrode 14. As such, polysulfide intermediates are formed (sulfur is reduced) on the surface of the positive electrode 14 in sequence while the battery 10 is discharging. The chemical potential difference between the positive electrode 14 and the negative electrode 12 (ranging from approximately 1.5 to 3.0 volts, depending on the exact chemical make-up of the electrodes 12, 14) drives electrons produced by the dissolution of lithium at the negative electrode 12 through the external circuit 24 towards the positive electrode 14. The resulting electric current passing through the external circuit 24 can be harnessed and directed through the load device 26 until the lithium in the negative electrode 12 is depleted and the capacity of the lithium-sulfur battery 10 is diminished, or until the level of lithium in the negative electrode 12 falls below a workable level, or until the need for electrical energy ceases.

The sulfur-based battery 10 can be charged or re-powered at any time by applying an external power source to the sulfur-based battery 10 to reverse the electrochemical reactions that occur during battery discharge. During charging (shown at reference numeral 22 in FIG. 1), lithium plating or alloying to the negative electrode 12 takes place and sulfur formation within the positive electrode 14 takes place. The connection of an external power source to the sulfur-based battery 10 compels the otherwise non-spontaneous oxidation of lithium at the positive electrode 14 to produce electrons and lithium ions. The electrons, which flow back towards the negative electrode 12 through the external circuit 24, and the lithium ions ($Li^+$), which are carried by the electrolyte 18 across the separator 16 back towards the negative electrode 12, reunite at the negative electrode 12 and replenish it with lithium for consumption during the next battery discharge cycle 20. The external power source that may be used to charge the sulfur-based battery 10 may vary depending on the size, construction, and particular end-use of the sulfur-based battery 10. Some suitable external power sources include a battery charger plugged into an AC wall outlet and a motor vehicle alternator.

Figure 2A:
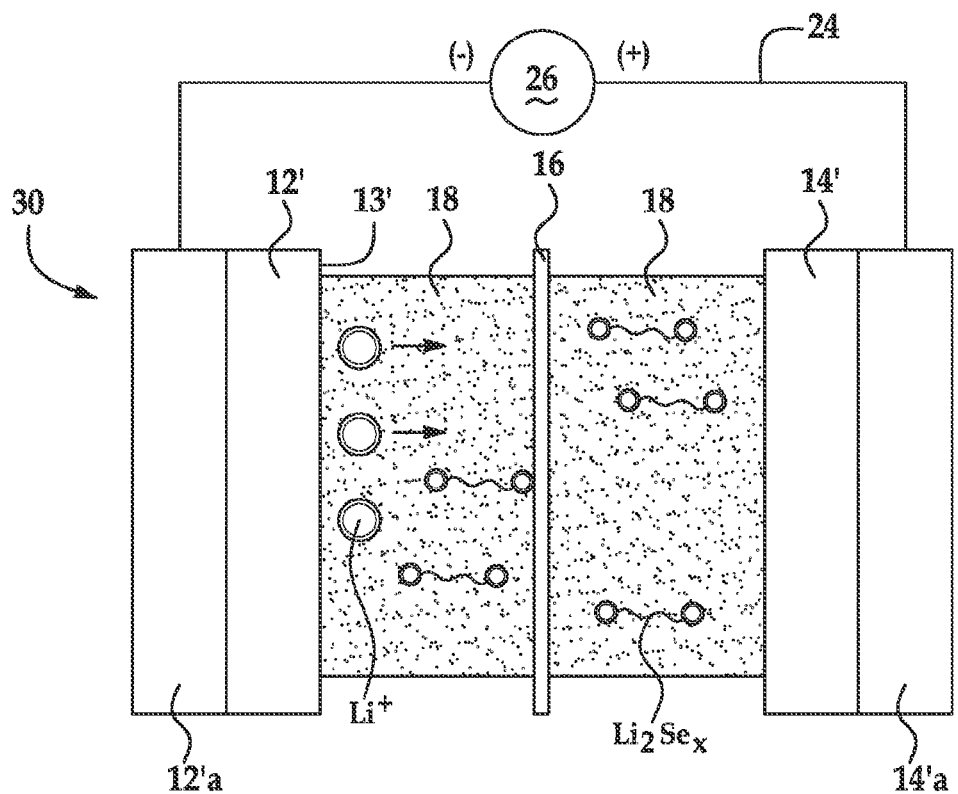
FIG. 2A is a schematic view of an example of a selenium-based battery including an electrolyte according to an example of the present disclosure.

It is to be understood that the electrolyte solution disclosed herein may be used in a selenium-based battery, an example of which is shown at reference numeral 30 in FIG. 2A. The selenium-based battery 30 includes a negative electrode 12', a positive electrode 14', and a porous polymer separator 16 positioned between the negative and positive electrodes 12', 14'.

In this example, the negative electrode 12' may include the binder material, the conductive filler material, and the active material. The negative electrode 12' may be fabricated using the method described herein for the negative electrode 12. The resulting negative electrode 12' may include up to 90% by total weight (i.e., 90 wt %) of the active material and up to 20% by total weight (i.e., 20 wt %) of each of the conductive filler and binder material. In an example, the negative electrode 12' includes about 70 wt % of the active material, about 15 wt % of the conductive filler material, and about 15 wt % of the binder material.

Any examples of the binder material and the conductive filler material for negative electrode 12 may be used for negative electrode 12'.

In this example, the active material of the negative electrode 12' may be graphite, lithium, or silicon. Commercial forms of graphite that may be used to fabricate the negative electrode active material are available from, for example, Timcal Graphite & Carbon (Bodio, Switzerland), Lonza Group (Basel, Switzerland), or Superior Graphite (Chicago, Ill.). It is to be understood that any example of the lithium-based active material or silicon-based active material previously described may be used for the negative electrode 12'.

The negative electrode 12' including graphite or silicon as the active material may be pre-lithiated using a lithium-silicon half cell method. More specifically, the Li—Si half cell is assembled using the silicon-based or graphite-based negative electrode 12', which is soaked in the pre-lithiation electrolyte solution previously described. Pre-lithiation may be accomplished using a suitable voltage potential as previously described. Pre-lithiation results in the formation of an example of the SEI layer 19 on the surface 13' of the negative electrode 12' (not shown in FIG. 2A). Pre-lithiation may also be accomplished by short circuiting lithium-silicon or lithium-graphite having the previously described electrolyte solution positioned therebetween.

It is to be understood that the negative electrode 12' may not be pre-lithiated (e.g., when lithium is used as the active material). In this example (while not shown in FIG. 2A), it is to be understood that another example of the SEI layer 19 may be formed on the surface 13' of the negative electrode 12' using the electrolyte solution disclosed herein. In this example, during the discharge process, the fluorinated ether in the electrolyte solution decomposes similarly to the FEC in the pre-lithiation electrolyte, as previously described. In the examples disclosed herein, decomposition of the fluorinated ether during discharge of the battery may take place whether or not the negative electrode 12 or 12' had previously been exposed to pre-lithiation.

The positive electrode 14' in the selenium-based battery 30 is formed of a selenium-carbon composite. In an example, the weight ratio of Se to C ranges from 1:9 to 9:1. The positive electrode 14' may also include a binder material, such as PVDF, and/or a conductive filler. Any of the previously listed conductive filler materials and binder materials may be used. In an example, the positive electrode 14' includes up to about 20 wt % of each of the binder material and the conductive filler.

Figure 2B:
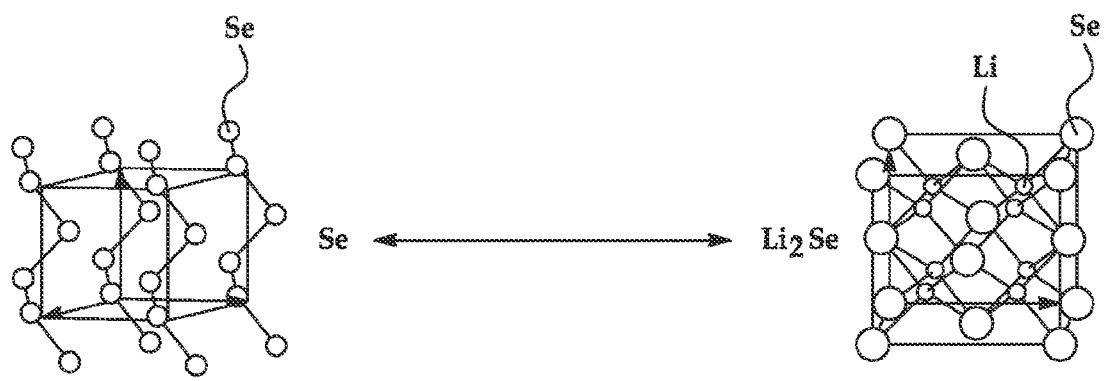
FIG. 2B illustrates the chemical structures of Se and $Li_2Se$.

During discharge, the chemical processes in the battery 30 include lithium ($Li^+$) dissolution from the surface of the negative electrode 12' and incorporation of the lithium cations into alkali metal polyselenium salts (i.e., $Li_2Se_x$) in the positive electrode 14', and as shown in FIG. 2A, in the electrolyte solution 18. FIG. 2B illustrates how the lithium cations ($Li^+$) are incorporated into the alkali metal polyselenium salts. As a result, polyselenide intermediates are formed on the surface of the positive electrode 14' while the battery 30 is discharging. The chemical potential difference between the positive electrode 14' and the negative electrode 12' (ranging from approximately 1.5 to 3.0 volts, depending on the exact chemical make-up of the electrodes 12', 14') drives electrons produced by the dissolution of lithium at the negative electrode 12' through the external circuit 24 towards the positive electrode 14'. The resulting electric current passing through the external circuit 24 can be harnessed and directed through the load device 26 until the lithium in the negative electrode 12' is depleted and the capacity of the selenium-based battery 30 is diminished, or until the level of lithium in the negative electrode 12' falls below a workable level, or until the need for electrical energy ceases.

As shown in FIG. 2A, the selenium-based battery 30 also includes the porous polymer separator 16. Any example of the porous polymer separator 16 previously described may be used.

It is to be understood that each of the negative electrode 12', the positive electrode 14', and the porous separator 16 are soaked in the battery electrolyte 18. In the examples disclosed herein, the battery electrolyte 18 is the previously described electrolyte solution.

Further, it is to be understood that the selenium-based battery 30 also includes current collectors 12'a and 14'a respectively positioned in contact with the negative electrode 12' and the positive electrode 14' to collect and move free electrons to and from the external circuit 24.

The selenium-based battery 30 can be charged or re-powered at any time by applying an external power source to the selenium-based battery 30 to reverse the electrochemical reactions that occur during battery discharge. During charging (not shown in FIG. 2A), lithium plating or alloying to the negative electrode 12' takes place and selenium formation within the positive electrode 14' takes place. The connection of an external power source to the selenium-based battery 30 compels the otherwise non-spontaneous oxidation of lithium at the positive electrode 14' to produce electrons and lithium ions. The electrons, which flow back towards the negative electrode 12' through the external circuit 24, and the lithium ions (Li$^+$), which are carried by the electrolyte 18 across the separator 16 back towards the negative electrode 12', reunite at the negative electrode 12' and replenish it with lithium for consumption during the next battery discharge cycle. The external power source that may be used to charge the selenium-based battery 30 may vary depending on the size, construction, and particular end-use of the selenium-based battery 30. Some suitable external power sources include a battery charger plugged into an AC wall outlet and a motor vehicle alternator.

While not shown, the selenium-based battery 30 may also include any other components that are known to skilled artisans.

To further illustrate the present disclosure, examples are given herein. It is to be understood that these examples are provided for illustrative purposes and are not to be construed as limiting the scope of the present disclosure.

EXAMPLE 1

An electrolyte solution was prepared using 0.4 M LiTFSI and 0.4 M LiNO$_3$ and 2.7 M R—S$_3$—R (R=a methyl group) in a mixture of DOL/DME 1:1 (vol).

The electrolyte solution was incorporated into an example pouch cell including a lithium-based negative electrode, a sulfur-based positive electrode, and a separator. The lithium anode was composed of lithium foil. The sulfur cathode was composed of 80% elemental sulfur, 10% conductive carbon material, and 10% binder. Polypropylene (PP2500) was used as the separator.

The galvanostatic cycling performance of the example pouch cell was tested by cycling between 1.6V and 2.8V at a rate of 0.1 C at room temperature.

Figure 3A:
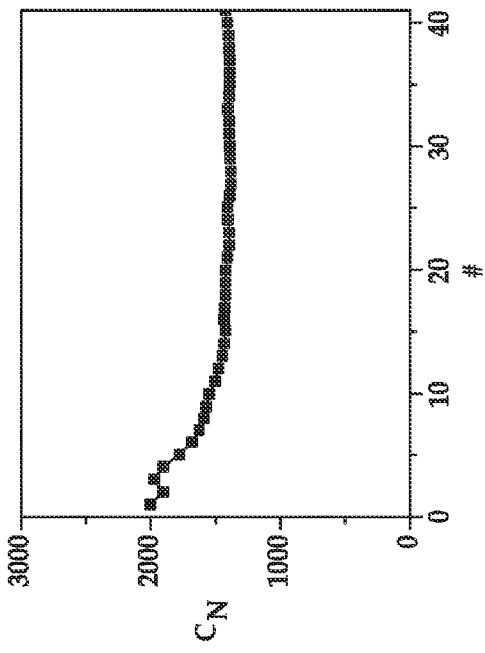
FIG. 3A is a graph illustrating the voltage profile (voltage (Y-axis labeled "V") vs. capacity (mAh/g, (X-axis labeled "C")) of the first cycle for an example of a pouch cell lithium-sulfur battery with an example of the electrolyte solution disclosed herein.
Figure 3B:
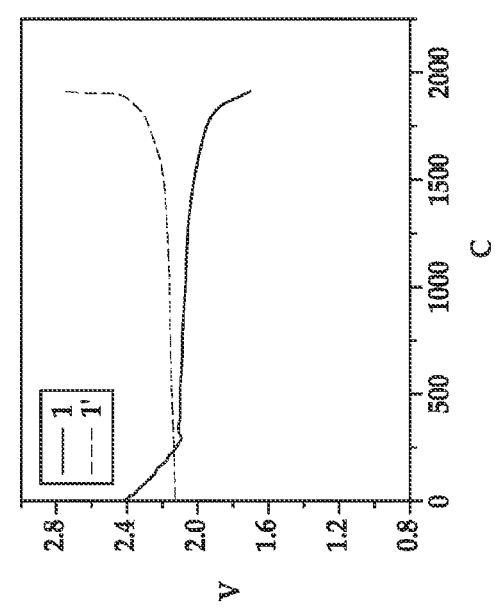
FIG. 3B is a graph illustrating the normalized specific capacity (mAh/g, Y-axis labeled "$C_N$") vs. cycle number (X-axis labeled "#") for the example pouch cell lithium-sulfur battery with an example of the electrolyte solution disclosed herein.

FIG. 3A illustrates the voltage profile (voltage, V, versus capacity, mAh/g) of the first cycle of the lithium-sulfur battery. The voltage profile during discharge is shown as "1" and the voltage profile during charge is shown as "1'". FIG. 3B illustrates the normalized specific capacity of the lithium-sulfur battery for the first forty cycles. The normalized specific capacity (mAh/g) is shown on the Y-axis (labeled "$C_N$") and the cycle number is shown on the X-axis (labeled "#"). As illustrated, the capacity is above 1750 mAh/g across the first five cycles, and is at or near 1500 mAh/g for the remaining cycles.

EXAMPLE 2

The same electrolyte solution of Example 1 was used in this example. In this example, a comparative electrolyte solution was also used, which included 0.4 M LiTFSI and 0.6 M LiNO$_3$ in a mixture of DOL/DME 1:1 (vol).

The electrolyte solution was incorporated into an example coin cell including a lithium-based negative electrode, a sulfur-based positive electrode, and a separator. The lithium anode was composed of lithium foil. The sulfur cathode was composed of 80% elemental sulfur, 10% conductive carbon material, and 10% binder. Polypropylene (PP2500) was used as the separator. A comparative coin cell was made with the same lithium anode, sulfur cathode, separator, and the comparative electrolyte solution.

The galvanostatic cycling performance of the example coin cell and the comparative coin cell was tested by cycling between 1.6V and 2.8V at a rate of 0.1 C at room temperature.

Figure 4:
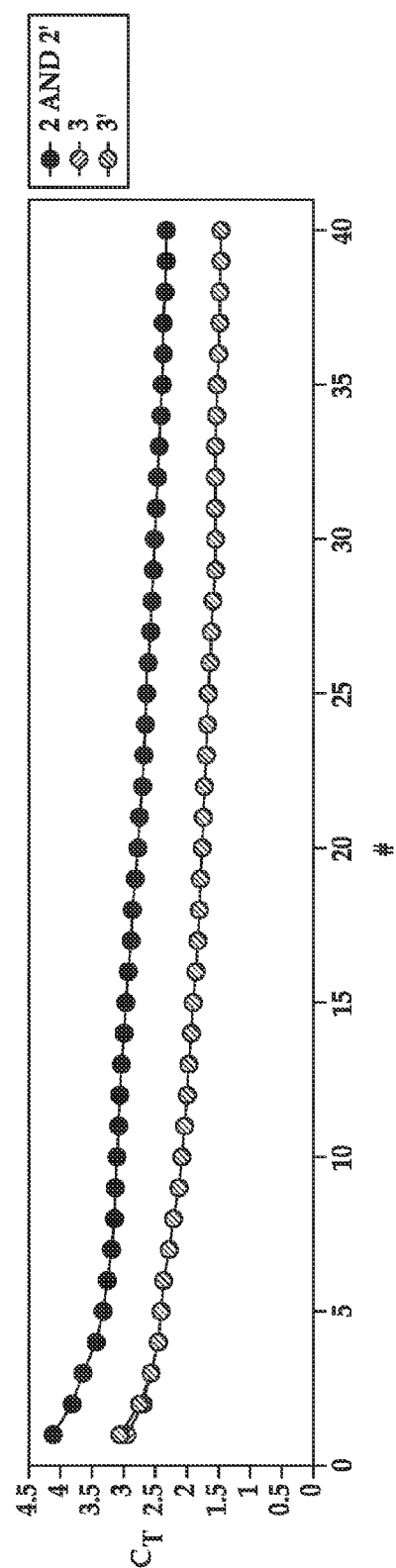
FIG. 4 is a graph illustrating the total capacity (mAh, Y-axis labeled "$C_T$") vs. cycle number (X-axis labeled "#") for an example of a coin cell lithium-sulfur battery with an example of the electrolyte solution disclosed herein and for a comparative coin cell lithium-sulfur battery including a comparative electrolyte solution.

The cycling performance for the example coin cell and comparative coin cell are shown in FIG. 4. In particular, the total capacity (mAh) is shown on the Y-axis (labeled "$C_T$") and the cycle number is shown on the X-axis (labeled "#"). In this graph, "2" represents the results during discharge of the example coin cell, "2'" represents the results during charge of the example coin cell, "3" represents the results during charge of the comparative coin cell, and "3'" represents the results during discharge of the comparative coin cell. As depicted, the charge and discharge results of the example coin cell overlap. This is due, in part, to the high Coulombic efficiency. When Coulombic efficiency is high, the charge and discharge profiles are nearly indistinguishable. Overall, the example coin cell, including the electrolyte solution disclosed herein, exhibited more stable performance and much improved capacity (about 20%) when compared to the comparative coin cell including the comparative electrolyte solution. It is believed that the combination of the additive (R—S$_n$—R) and the fluorinated ether contributes to the formation of a more stable SEI, and also helps to dissolve sulfur from the sulfur electrode, which enables sulfur to be used more efficiently.

EXAMPLE 3

The same electrolyte solution of Example 1 was used in this example.

The electrolyte solution was incorporated into an example full silicon-sulfur battery. The example full silicon-sulfur battery included a silicon-based negative electrode, a sulfur-based positive electrode, and a separator. The silicon anode was composed of 60% elemental silicon, 20% conductive carbon material, and 20% binder. The sulfur cathode was composed of 80% elemental sulfur, 10% conductive carbon material, and 10% binder. Polypropylene (PP2500) was used as the separator.

The galvanostatic cycling performance of the example full silicon-sulfur battery was tested by cycling between 1.2V and 2.6V at a rate of 0.1 C at room temperature.

Figure 5A:
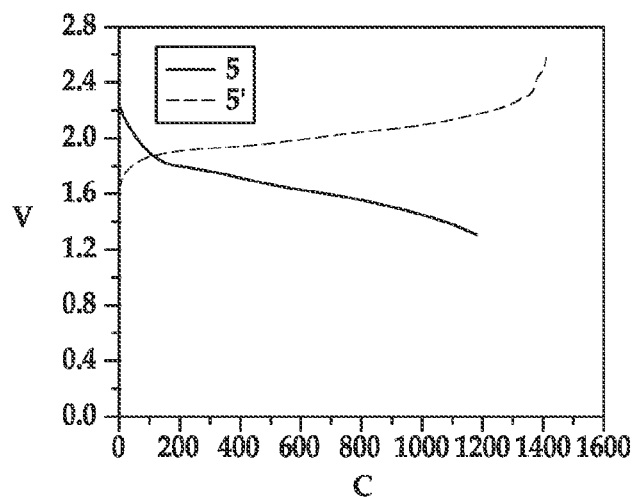
FIG. 5A is a graph illustrating the voltage profile (voltage (Y-axis labeled "V") vs. capacity (mAh/g, X-axis labeled "C")) of the first cycle for an example silicon-sulfur battery with an example of the electrolyte solution disclosed herein.
Figure 5B:
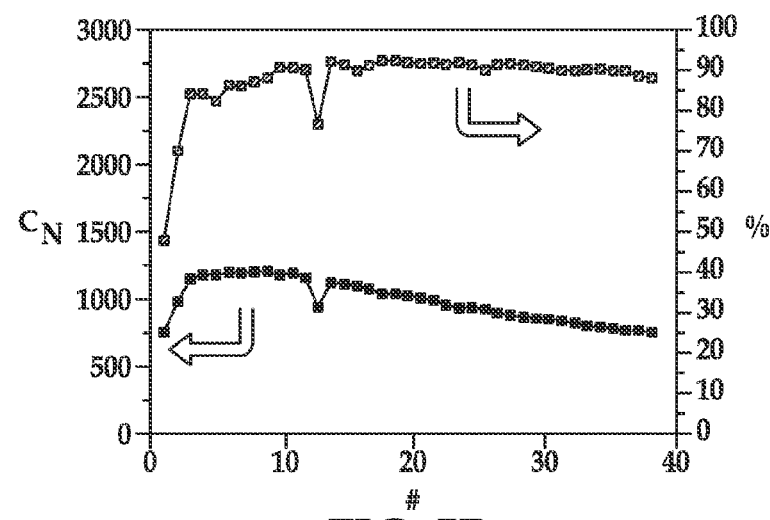
FIG. 5B is a graph illustrating the normalized specific capacity (mAh/g, left Y-axis labeled "$C_N$") vs. cycle number (X-axis labeled "#") and the Coulombic efficiency (%, right Y-axis labeled "%") vs. cycle number (X-axis labeled "#") for the example silicon-sulfur battery with an example of the electrolyte solution disclosed herein.

FIG. 5A illustrates the voltage profile (voltage versus capacity, mAh/g) of the first cycle of the silicon-sulfur battery. The voltage profile during discharge is shown as "5" and the voltage profile during charge is shown as "5'". FIG. 5B illustrates the normalized specific capacity of the silicon-sulfur battery for the first forty cycles. The normalized specific capacity (mAh/g) is shown on the left Y-axis (labeled "$C_N$") and the cycle number is shown on the X-axis (labeled "#"). FIG. 5B also illustrates the Coulombic efficiency of the silicon-sulfur battery for the first forty cycles. The Coulombic efficiency (%) is shown on the right Y-axis (labeled "%") and, as previously mentioned, the cycle number is shown on the X-axis. The capacity and Coulombic efficiency results are well within desirable ranges for a silicon-sulfur battery, thus illustrating that the electrolyte solutions disclosed herein may be used in a silicon-sulfur battery.

EXAMPLE 4

Another electrolyte solution was prepared including 1 M LiTFSI in DOL/DME (1:1 vol) with 15 vol % R—S$_3$—R, where R was a methyl group. A comparative electrolyte solution was prepared including 1 M LiTFSI in DOL/DME (1:1 vol).

The electrolyte solution and the comparative electrolyte solution were incorporated, respectively, into an example lithium-selenium battery and a comparative lithium-selenium battery. The example and comparative lithium-selenium batteries each included a lithium-based negative electrode, a selenium-based positive electrode, and a separator. The lithium anode was lithium foil. The selenium cathode was composed of 80% selenium/carbon composite, 10% conductive carbon material, and 10% binder. Of the selenium/carbon composite, 70 wt % was selenium. Polypropylene (PP2500) was used as the separator.

The galvanostatic cycling performance of the example and comparative lithium-selenium battery was tested by cycling between 1.0V and 3.0V at a rate of 0.1 C at room temperature.

Figure 6:
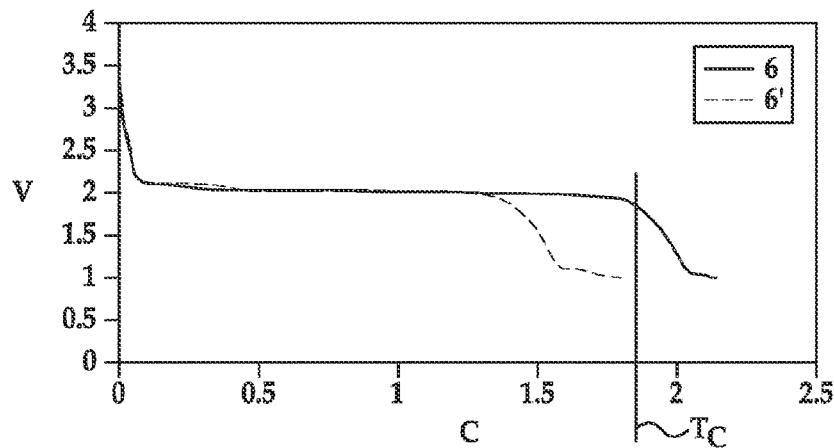
FIG. 6 is a graph illustrating the voltage (Y-axis labeled "V") vs. capacity (mAh, X-axis labeled "C") for an example selenium-sulfur battery with another example of the electrolyte solution disclosed herein.

FIG. 6 illustrates the voltage profile (voltage versus capacity, mAh) of the first cycle of the lithium-selenium battery. The voltage profile during discharge is for the example lithium-selenium battery "6" and comparative lithium-selenium battery "6'". The battery with the example electrolyte provides a 20% increase in capacity, which is actually beyond the theoretical capacity of selenium (which is 678 mAh/g, shown as $T_C$ in FIG. 6).

It is to be understood that the ranges provided herein include the stated range and any value or sub-range within the stated range. For example, a range of about 0.1 M to about 2 M should be interpreted to include not only the explicitly recited limits of about 0.1 M to about 2 M, but also to include individual values, such as 0.2 M, 0.5 M, 1.9 M etc., and sub-ranges, such as from 0.25 M to about 0.8 M; from about 0.3 M to about 1.7 M, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An electrolyte solution, comprising:
   a solvent;
   a lithium salt;
   a fluorinated ether; and
   an additive represented by R—$(S_nSe_m)$—R, wherein 2<n<8 and 2<m<8, and wherein each R is independently selected from a straight or branched alkyl group having from 1 carbon to 6 carbons.

2. The electrolyte solution as defined in claim 1 wherein the solvent is selected from the group consisting of 1,3-dioxolane, dimethoxyethane, and a mixture of 1,3-dioxolane and dimethoxyethane.

3. The electrolyte solution as defined in claim 1 wherein the fluorinated ether is selected from the group consisting of bis(2,2,2-trifluoroethyl) ether ($F_3C$—$CH_2$—O—$CH_2$—$CF_3$) and propyl 1,1,2,2-tetrafluoroethyl ether ($H_7C_3$—O—$CF_2$—$CHF_2$).

4. The electrolyte solution as defined in claim 1 wherein the lithium salt is selected from the group consisting of LiN(CF$_3$SO$_2$)$_2$ (LiTFSI or lithium bis(trifluoromethylsulfonyl)imide), LiNO$_3$, LiPF$_6$, LiBF$_4$, LiClO$_4$, LiB(C$_2$O$_4$)$_2$ (LiBOB), LiBF$_2$(C$_2$O$_4$) (LiODFB), LiN(SO$_2$F)$_2$ (LiFSI), LiPF$_3$(C$_2$F$_5$)$_3$ (LiFAP), LiPF$_4$(CF$_3$)$_2$, LiPF$_3$(CF$_3$)$_3$, LiSO$_3$CF$_3$, LiAlCl$_4$, LiI, LiBr, LiSCN, LiB(C$_6$H$_5$)$_4$, LiAsF$_6$, LiCF$_3$SO$_3$, LiPF$_4$(C$_2$O$_4$) (LiFOP), and combinations thereof.

5. The electrolyte solution as defined in claim 1 wherein a concentration of fluorinated ether in the electrolyte solution ranges from about 0.1 M to about 1 M, and a concentration of the additive in the electrolyte solution ranges from about 0.2 M to about 1 M.

6. The electrolyte solution as defined in claim 1 wherein each R is a methyl group.

7. A sulfur-based battery, comprising:
   a negative electrode;
   a positive electrode including a sulfur-based active material;
   a separator positioned between the negative electrode and the positive electrode; and
   an electrolyte solution soaking each of the positive electrode, the negative electrode, and the separator, wherein the electrolyte solution includes:
   a solvent;
   a lithium salt;
   a fluorinated ether; and
   an additive represented by R—$(S_nSe_m)$—R, wherein 2<n<8 and 2<m<8, and wherein each R is independently selected from a straight or branched alkyl group having from 1 carbon to 6 carbons.

8. The sulfur-based battery as defined in claim 7 wherein the negative electrode includes a silicon-based active material.

9. The sulfur-based battery as defined in claim 7 wherein the negative electrode includes a lithium-based active material.

10. The sulfur-based battery as defined in claim 7 wherein:
    the solvent is selected from the group consisting of 1,3-dioxolane, dimethoxyethane, and a mixture of 1,3-dioxolane and dimethoxyethane;
    the fluorinated ether is selected from the group consisting of bis(2,2,2-trifluoroethyl) ether ($F_3C$—$CH_2$—O—$CH_2$—$CF_3$) and propyl 1,1,2,2-tetrafluoroethyl ether ($H_7C_3$—O—$CF_2$—$CHF_2$); and
    the lithium salt is selected from the group consisting of LiN(CF$_3$SO$_2$)$_2$ (LiTFSI or lithium bis(trifluoromethylsulfonyl)imide), LiNO$_3$, LiPF$_6$, LiBF$_4$, LiClO$_4$, LiB(C$_2$O$_4$)$_2$ (LiBOB), LiBF$_2$(C$_2$O$_4$) (LiODFB), LiN(SO$_2$F)$_2$ (LiFSI), LiPF$_3$(C$_2$F$_5$)$_3$ (LiFAP), LiPF$_4$(CF$_3$)$_2$, LiPF$_3$(CF$_3$)$_3$, LiSO$_3$CF$_3$, LiAlCl$_4$, LiI, LiBr, LiSCN, LiB(C$_6$H$_5$)$_4$, LiAsF$_6$, LiCF$_3$SO$_3$, LiPF$_4$(C$_2$O$_4$) (LiFOP), and combinations thereof.

11. The sulfur-based battery as defined in claim 7 wherein a concentration of fluorinated ether in the electrolyte solution ranges from about 0.1 M to about 1 M, and a concentration of the additive in the electrolyte solution ranges from about 0.2 M to about 1 M.

12. The sulfur-based battery as defined in claim 7 wherein each R is a methyl group.

13. A selenium-based battery, comprising:
    a negative electrode;
    a positive electrode including a selenium-based active material;
    a separator positioned between the negative electrode and the positive electrode; and
    an electrolyte solution soaking each of the positive electrode, the negative electrode, and the separator, wherein the electrolyte solution comprises:
    a solvent;
    a lithium salt;
    a fluorinated ether; and
    an additive represented by R—$(S_nSe_m)$—R, wherein 2<n<8 and 2<m<8, and wherein each R is independently selected from a straight or branched alkyl group having from 1 carbon to 6 carbons.

14. The selenium-based battery as defined in claim 13 wherein the negative electrode includes an active material selected from the group consisting of graphite, a lithium-based active material, and a silicon-based active material.

15. The selenium-based battery as defined in claim 13 wherein:
- the solvent is selected from the group consisting of 1,3-dioxolane, dimethoxyethane, and a mixture of 1,3-dioxolane and dimethoxyethane;
- the fluorinated ether is selected from the group consisting of bis(2,2,2-trifluoroethyl) ether ($F_3C$—$CH_2$—O—$CH_2$—$CF_3$) and propyl 1,1,2,2-tetrafluoroethyl ether ($H_7C_3$—O—$CF_2$—$CHF_2$); and
- the lithium salt is selected from the group consisting of $LiN(CF_3SO_2)_2$ (LiTFSI or lithium bis(trifluoromethylsulfonyl)imide), $LiNO_3$, $LiPF_6$, $LiBF_4$, $LiClO_4$, $LiB(C_2O_4)_2$ (LiBOB), $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_3(CF_3)_3$, $LiSO_3CF_3$, $LiAlCl_4$, LiI, LiBr, LiSCN, $LiB(C_6H_5)_4$, $LiAsF_6$, $LiCF_3SO_3$, $LiPF_4(C_2O_4)$ (LiFOP), and combinations thereof.

\* \* \* \* \*